Patented Apr. 28, 1936

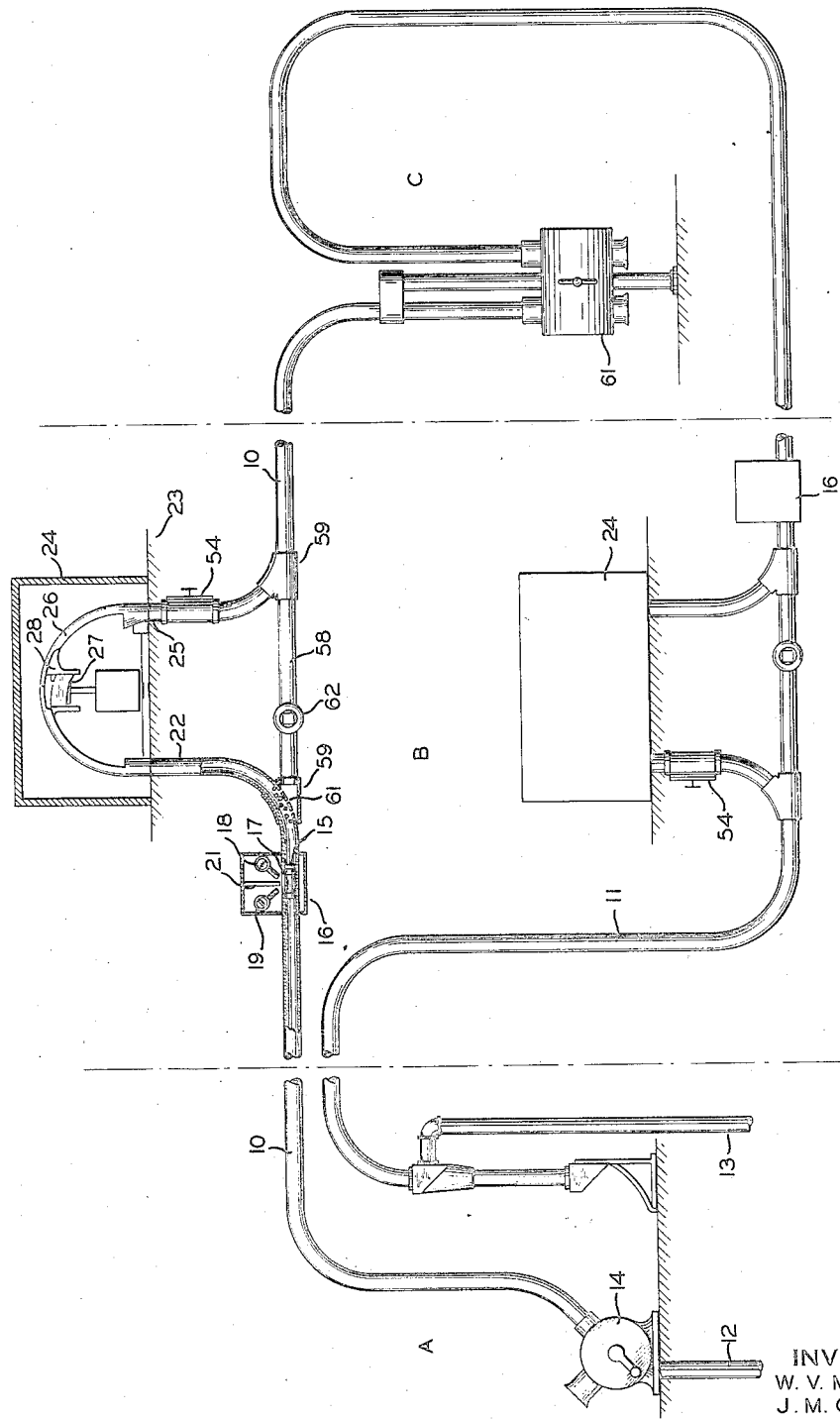

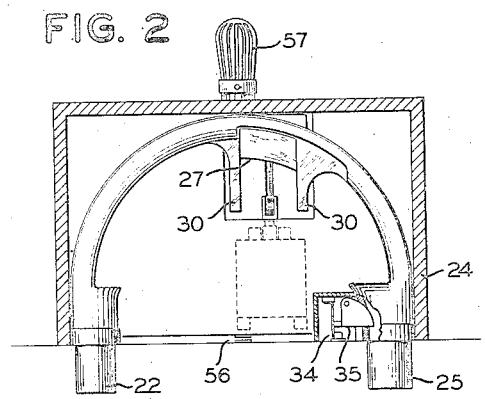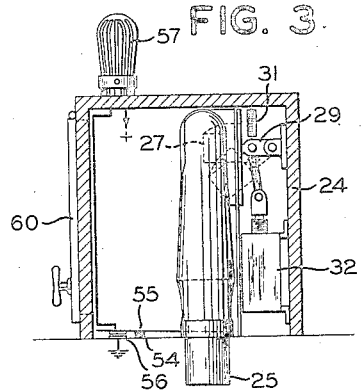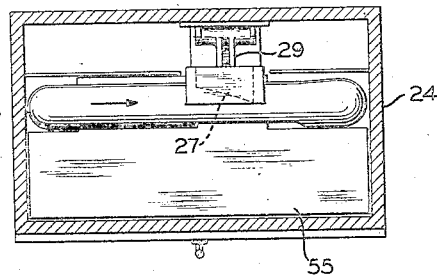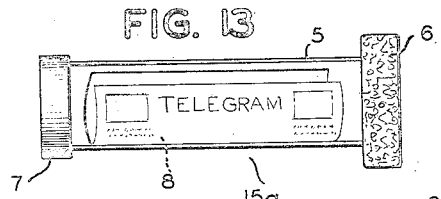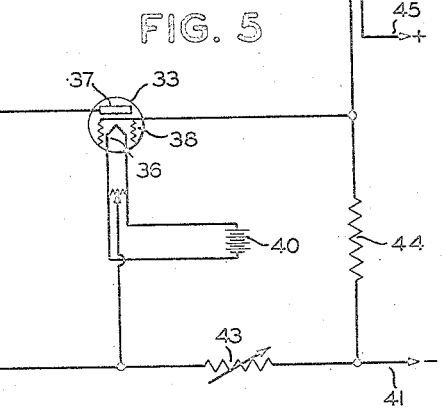

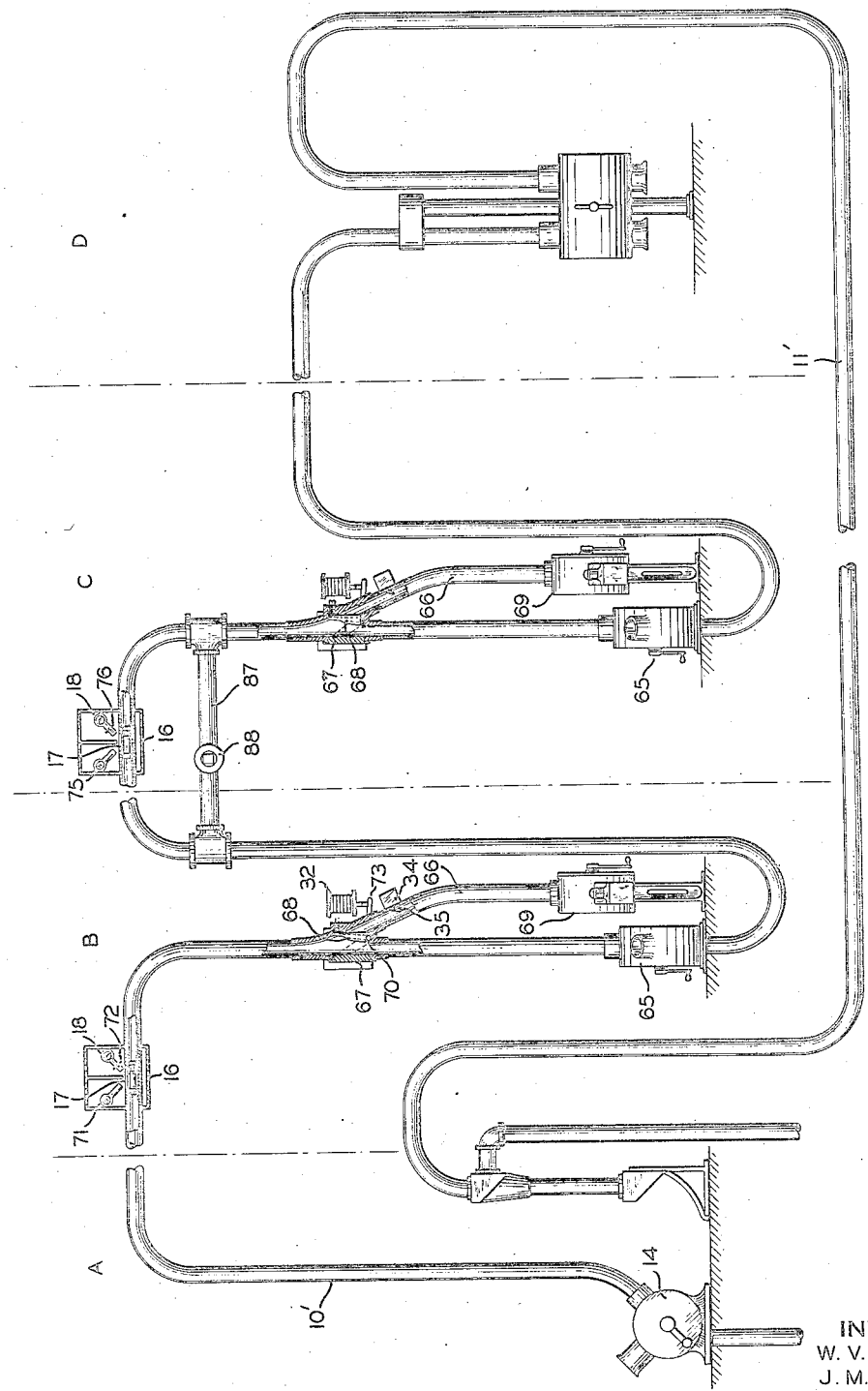

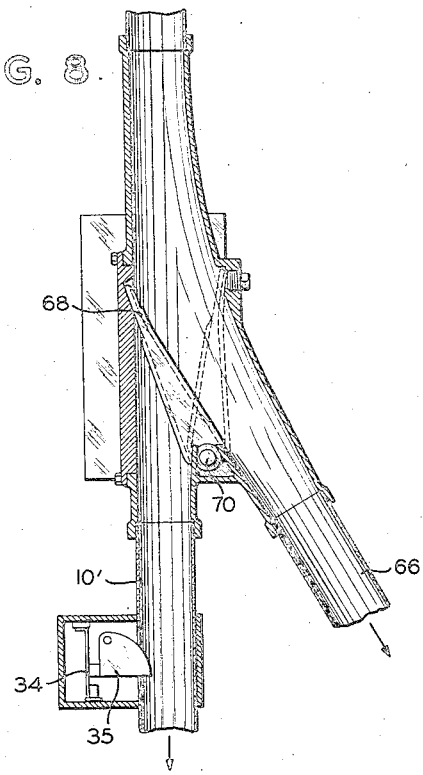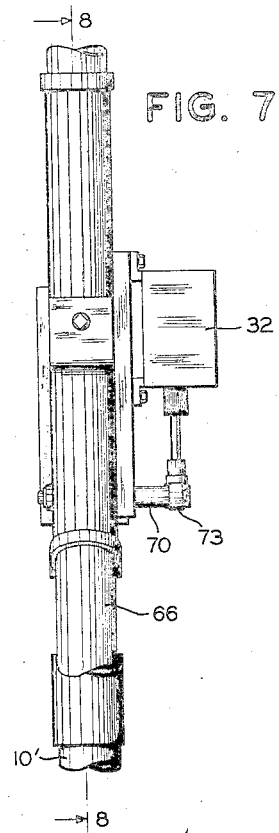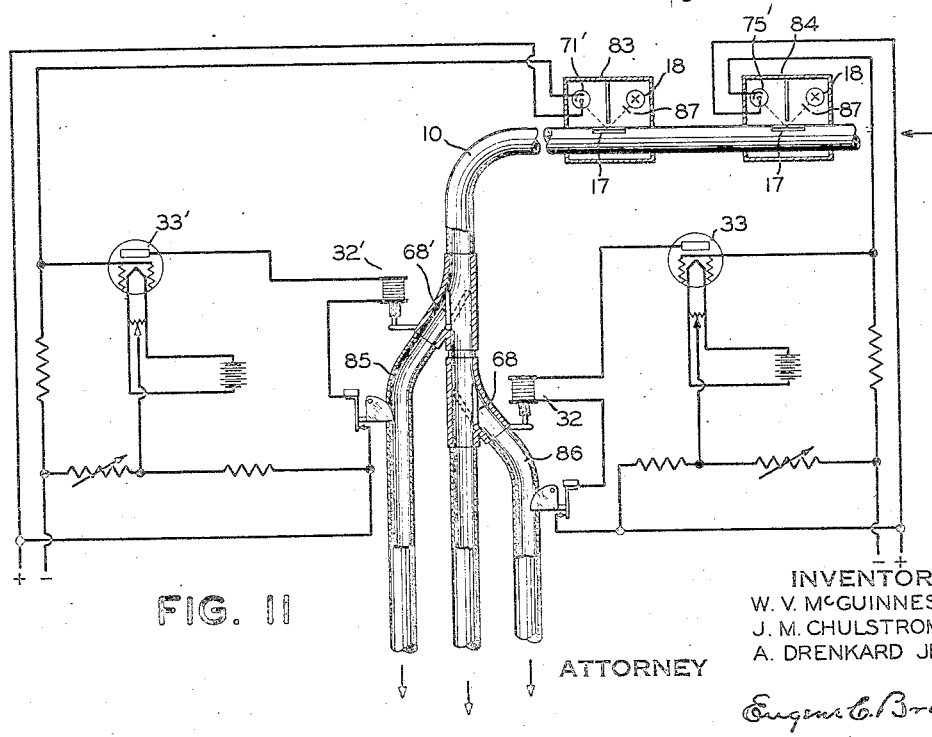

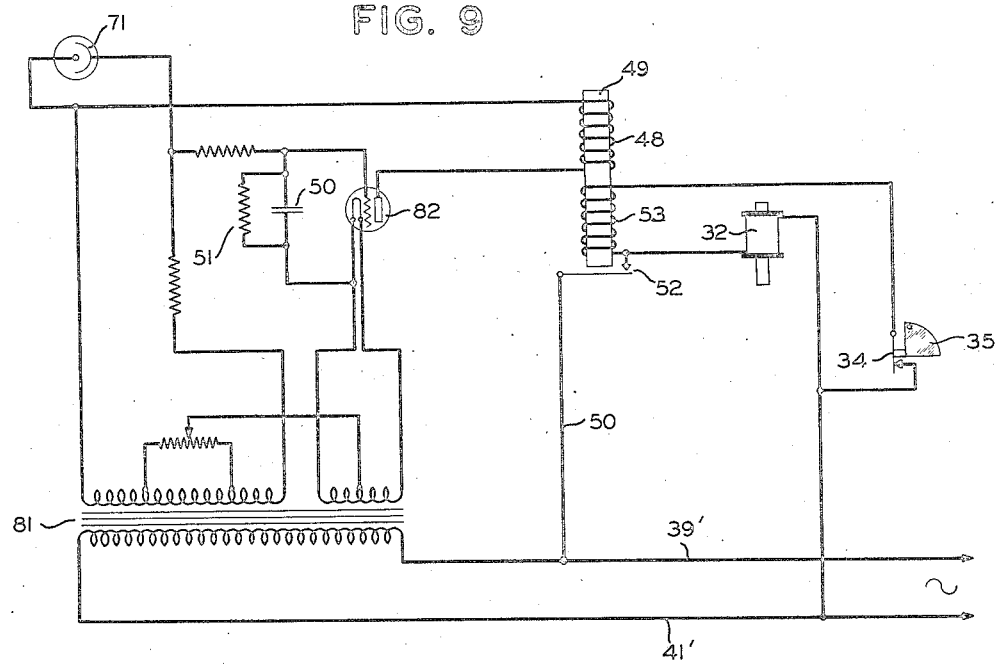
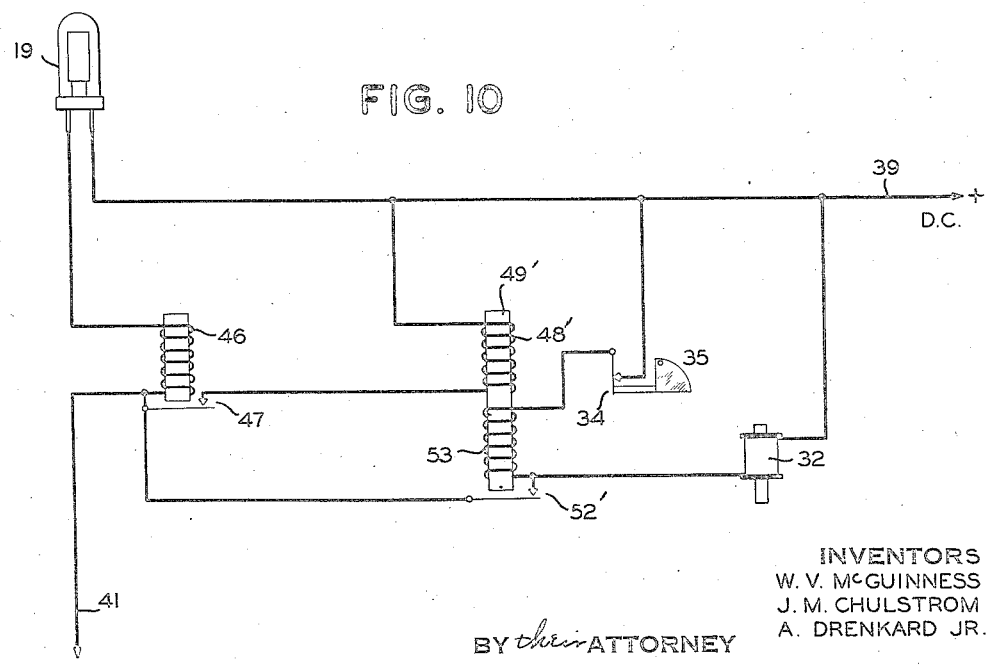

2,039,016

UNITED STATES PATENT OFFICE 2,039,016

SELECTIVE TUBE SYSTEM

William V. McGuinness, Flushing, and John M. Chulstrom, Elmhurst, N. Y., and Adam Drenkard, Jr., Grantwood, N. J., assignors to The Western Union Telegraph Company, New York, N. Y., a corporation of New York Application September 22, 1931, Serial No. 564,384

7 Claims. (Cl. 243—16)

This invention relates to carrier conveyor systems and more particularly to pneumatic tube carrier systems; and it has for an object to provide means for selectively discharging predetermined carriers from the tube or guideway at designated points therealong.

A more particular object of the invention is to provide means for selectively discharging carriers from a pneumatic conveyor system, independently of mechanical contact of the carrier with the selecting mechanisms.

Another object of the invention is to provide a pneumatic tube system having one or more intermediate stations with means at the intermediate stations for selectively discharging only carriers designated for such stations.

According to one embodiment of this invention, the system may include a distant station and two intermediate stations, and carriers arranged to reflect different amounts of light or colors for indicating the station to which they are destined. The carriers destined for the first intermediate station may have a black external surface, those for the second intermediate station a gray surface, and those for the distant end station, a white surface. In another embodiment, colored carriers may be used. For example, blue carriers may be employed for one intermediate station, red for the other, and black for the terminal station. In systems employing more than two intermediate stations, other shades of gray or other colors may be employed to designate the carriers destined for other stations. The light reflecting properties are not necessarily derived from the carriers themselves or their external surface. For example, carriers having transparent shells may be employed and the colors or shades for providing the required light reflecting properties may be present on the message itself or other article which is enclosed in the transparent carrier.

For causing the carriers to be discharged at the proper station, the light reflected from the carriers is directed upon light sensitive cells, such as selenium or photoelectric cells, which are arranged to control an electric circuit for operating suitable selecting mechanism. Selenium cells or photoelectric cells, as is well known, can be designed and adjusted to respond very quickly and sharply to certain predetermined amounts or colors of light. Light sensitive cells combined with the type of vacuum tube relays proposed by this invention, produce a rapid and reliable high speed selecting mechanism by which interference and obstructions to the travel of the carriers are eliminated.

Another object, therefore, is to provide carriers having different light reflecting properties, and means at the intermediate stations, responsive to the light reflected from the carriers passing thorugh the system, to cause the discharge means to eject only the carriers having such predetermined light reflecting properties.

Still another object is to adapt a conveyor system, of the character set forth, to pneumatic tube systems employing either box terminals, or forked or Y-type terminals, at the intermediate stations.

Still another object of this invention is to provide a system of the character described wherein, if the selective means in any part of the system fails to respond to the light selectively reflected by the carrier, due to a soiled condition of the carrier or due otherwise to a failure of the light sensitive mechanism to function, that part of the system is automatically rendered manually operative.

These and other objects are effected by our invention, as will be apparent from the following description and claims taken in connection with the accompanying drawings, forming a part of this application, in which:

Fig. 1 is a diagrammatic view of a conveyor system employing a main station, a distant station and one intermediate station using a loop arrangement at the intermediate station;

Figs. 2, 3 and 4 are enlarged side elevation, end elevation and plan views respectively, of the loop arrangement employed at the intermediate station of the system shown in Fig. 1;

Fig. 5 is a detail view of one type of light sensitive discharge control apparatus and circuit employed in the systems shown in Fig. 1;

Fig. 6 is a diagrammatic view of another type of conveyor system employing a main station, a distant station, and two intermediate stations and which embodies well known types of discharge apparatus at the intermediate stations;

Fig. 7 is a side elevation of a tube equipped with a type of discharge deflector, which may be employed in the system shown in Fig. 6;

Fig. 8 is a sectional view on the line 8—8 of Fig. 7;

Fig. 9 is a circuit diagram of an arrangement, for controlling the discharge at the intermediate stations, employing a photoelectric cell and a vacuum tube amplifier.

Fig. 10 is a circuit diagram of an arrangement employing a selenium cell for actuating the discharge means;

Fig. 11 is a diagrammatic view showing a conveyor tube system employing two branch tubes leading from the main tube with deflector means for diverting certain carriers from the main tube into each of the branch tubes, together with a suitable arrangement of the light sensitive control means responsive to carriers of different colors and the circuit diagram associated therewith;

Fig. 13 shows a carrier in which the selecting characteristic is embodied in the enclosed message blank.

Figure 12:
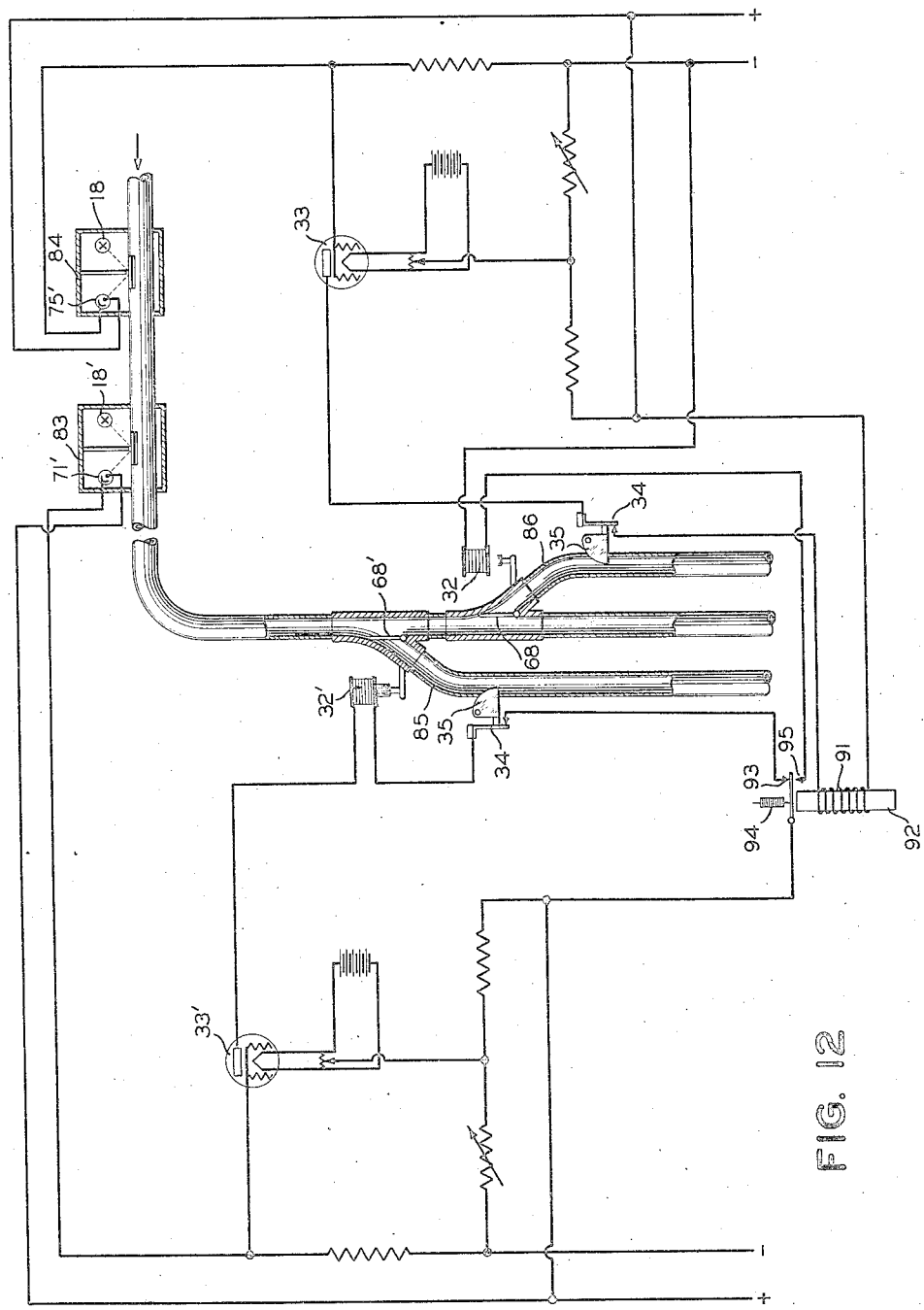
Fig. 12 is a diagrammatic view of another arrangements of the system shown in Fig. 11 responsive to carriers reflecting light of different intensities.

Referring to the embodiment shown in Fig. 1, the conveyor system comprises a main station A, an intermediate station B and a distant station C. These stations are connected through a forward tube 10 and a return tube 11. The forward and return tubes are each connected to a separate source of air, the forward tube being connected to a source of pressure through the tube 12 and the return tube 11 being connected preferably to a source of vacuum through the tube 13. At the main station A, an inlet 14 of the rotary drum type may be employed for feeding the carriers into the forward tube 10. Any other suitable type of inlet may be employed, however. The carriers used may be any well known type of cylindrical container arranged to receive message blanks or other articles. A carrier 15 is shown in the sectioned portion of the forward tube 10. As the carriers are fed into the system, they are transported forward either by the pressure of the air behind them, the vacuum ahead of them, or by both pressure and vacuum.

The destination of the carriers is determined by the light or color reflecting property of the carrier. The color or shade may be provided by suitably coloring the outer surface of the carrier or the carrier body may be of transparent material or other material such as wire cloth or the like, permitting the passage of light, and suitably colored message blanks or other material introduced into the transparent portion of the carrier to provide the required color indication. A carrier 15a of the latter type is illustrated in Fig. 13. It comprises a shell 5 which may be made of transparent cellulose material, wire cloth or other fabricated structure, or any material which will permit shades and colors of light to pass through. The shell is provided with the usual felt head 6 at the closed end and a collar 7 at the open end. The shade or color designation is provided by employing message blanks 8 of suitable color or shade. Messages for the several stations will be inscribed on blanks of different colors according to the station to which it is to be sent. With transparent carriers the same carriers may be employed for all stations.

The discharge mechanism at the intermediate stations is selectively controlled without any mechanical contact between the carriers and the control means by employing light sensitive cells disposed at each intermediate station to receive the light reflected from the carriers as they pass an opening in the conveyor tube located at a point slightly in advance of the discharge. Although the type of deflector mechanism and controls employed acts very rapidly, it is necessary that the light sensitive cell be positioned in advance of the discharge terminal to insure that the discharge mechanism will have operated in response to the light from the carrier before the latter has reached the discharge point.

As a light sensitive cell, either selenium or photoelectric cells may be employed and arranged to operate a discharge mechanism through a local circuit such as shown in Fig. 5. Where the carriers are designated by black and white or by colors in widely separated bands of the spectrum, selenium cells may be employed. But where the carriers send out amounts of light less contrasted than black and white or color bands not widely separated in the spectrum, photoelectric cells will be found more satisfactory. A diagrammatic arrangement of a light source and a sensitive cell relative to the opening in the conveyor tube is shown enclosed in the compartment 16 (Figs. 1 and 5). The compartment encloses an opening or slot 17 in the conveyor tube 10. In one section of the compartment is a light source 18 having means to direct a beam of light toward the opening 17 in the conveyor tube and a light sensitive cell 19 is disposed in another section of the compartment. A suitable partition 21 is disposed in the compartment between the source of light and the light sensitive cell to prevent any light other than that reflected from the carrier from falling upon the cell. A carrier 15 is shown diagrammatically in the tube 10 as passing before the opening 17. Light is thrown upon the carriers as they pass before the opening and reflected from the carrier into the light sensitive cell. In order to prevent the escape of air from the tube through the opening, the compartment 16 is arranged to fit closely around the tube 10 and provide a substantially air-tight chamber. The relative arrangement of the source of light and light sensitive cell and the conveyor tube may be such that the light path lies longitudinaly of the tube as diagrammatically shown in Fig. 1 or transversely of the type as shown in detail view in Fig. 5. Instead of the fixed light source 18, a light source might be provided on the carrier by employing light emitting compounds of radium or other suitable light emitting means.

In many installations of pneumatic message handling systems, such as installations in brokerage offices and like, it is desirable for esthetic or other reasons that the entering and leaving conveyor tubes be disposed out of sight. This may be accomplished by arranging the tubes underneath the office floor with branches leading upwardly to a discharge arranged on a suitable desk, table, or other platform. According to the embodiment shown in Fig. 1, the conveyor tube 10 has been arranged to lead upwardly through an extension tube 22, to the platform 23 and enter a terminal box or compartment 24 provided thereon and to leave the box through an extension tube 25, running back down to the forwardly extending part of the tube 10. Within the compartment 24, a guideway is provided in the form of an arcuate loop 26, for joining the terminals of the extension tubes 22 and 25. The inner wall of the loop is cut away so that the outer wall forms substantially a concave or semi-cylindrical arcuate band. The arrangement is such that the centrifugal force of traveling carriers entering the loop guideway 26 causes the carriers to cling to the inner surface of the concave guideway until they have reentered the conveyor through the extension 25.

A deflector in the form of a shiftable member or block 27 is arranged with a face thereof disposed angularly across the path of travel of carriers to divert the same into the terminal box as they travel around the loop. The block is so placed that it normally rests in the carrier path, preferably near the top of loop guideway. However, the block can be shifted out of the carrier path by suitable control mechanism, presently to be described, governed by a light sensitive cell in response to light reflected from carriers destined for stations beyond.

With this type of an arrangement the carrier system will not be rendered inoperative due to failure of the selective apparatus to function. This is due to the fact that the deflector or discharge means at each of the intermediate stations is normally set to deflect each carrier from the tube or guideway as it arrives at the station, and the light sensitive control means is arranged to respond to through carriers to cause the deflector to be moved out of position or otherwise be rendered inoperative before the through carriers are permitted to pass through the station and proceed along the conveyor system. So if the control system fails to respond to the carriers destined for stations beyond, all of the carriers arriving at each of the intermediate stations are deposited at the discharge terminal of the station. The station attendant, upon observing carriers designated for stations beyond, being deposited at his station, may assort these from the carriers intended for his station and insert them into an inlet terminal provided at his station from whence they will proceed to the designated station. In this manner, upon failure of the selective mechanism, the system is not rendered inoperative to convey the carriers, but is merely rendered inoperative as an automatic system.

Referring to Figs. 2 to 4, the deflector may be pivotally mounted from the side of the terminal compartment 24 on a suitable arm 29 which will permit the deflector to be lowered out of and raised into operating position. Suitable guide members 30 may be provided to steady the deflector against the impact of the moving carriers.

The deflector member is held in operating position by a suitable tension spring 31 and is drawn downwardly out of operating position by a solenoid 32 or other suitable electrically operated apparatus.

The solenoid 32 is operated through a local circuit employing a control relay governed by the selective light sensitive cell. One form of this local circuit is shown in Fig. 5. It includes the solenoid 32, a relay in the form of an arc discharge tube 33 and a switch 34 operated by cam 35 or other suitable trip member to open the circuit when engaged by the carriers which are permitted to pass through the discharge compartment. The switch 34 is preferably arranged, as shown in Fig. 2, at the entrance of the extension 25 of the conveyor tube.

Referring again to Fig. 5, the relay tube 33 preferably has what may be termed a "trigger" operating characteristic. In other words, the tube is of the type which employs a starting grid or other suitable starting arrangement which when subjected to certain conditions will cause an arc to form between the cathode and the anode, and set up a current flow in the anode circuit which will continue independently of the starting grid or the starting means until the anode circuit is interrupted, or the tube quenched.

The tube is preferably of the hot cathode type and is provided with a cathode 36 heated by a suitable battery or other source of potential 40, an anode 37, and a starting grid 38. Certain types of arc discharge tubes have similar characteristics to those desired for use herein.

As shown in Fig. 5, the terminal 39 is connected with a positive source of potential and the terminal 41 with a negative source of potential. Resistances 42 and 43 are connected between these two terminals. The solenoid 32, and the switch 34 are included in the anode circuit of the relay tube. The resistance 43 and a supplementary resistance 44 are included in the grid circuit of the tube. Connected directly with the grid is one of the terminals of the selenium cell 19, the other terminal of which is connected with a source of positive potential.

The varying drop in potential across the first resistance 44 causes the potential of the grid 38 of the relay tube to be varied in accordance with the change of flow of current through the selenium cell due to light being reflected upon the cell from the carriers as they pass. In order to compensate for the normal flow of current through the selenium cell, the cathode of the tube is connected at a point in the circuit having a higher potential than 41, which is provided by connecting the cathode above the variable resistance 43. With a variable resistance the grid and cathode of the tube may be suitably adjusted to maintain the tube suppressed under normal conditions of current flow through the selenium cell.

A suitable potential difference between the cathode and anode of the relay or arc discharge tube is provided through the drop in potential across the resistance 42. When the tube is triggered off by the starting grid, current flows through the anode circuit, actuating the solenoid 32. This current flow through the tube is interrupted and the tube quenched when a carrier strikes the cam 35 and opens the switch 34 in the anode circuit.

Referring again to Fig. 1, the loop guideway 26 of the conveyor tube, as already explained, is so arranged that the speed or momentum of the carrier is sufficient to propel the carrier around the loop and that centrifugal force causes it to cling to the inner surface of the guideway. For this reason, it is not necessary that the full force of the air in the tube should follow the carrier through the terminal box. Therefore, a shunt or by-pass tube section 58 is provided between the tube extensions 22 and 25 at the point where they bend away from the straight portion of the conveyor tube 10. The shunt section is connected to the main tube by means of suitable couplings 59 and small openings 61 communicating with the couplings. In this manner a substantially straight path is provided for that portion of the air not required to propel the carrier through the terminal box. A by-pass valve 62 may be provided in the shunt tube for adjusting the flow of air to insure that the sufficient amount is diverted through the loop and terminal box to propel the carrier with proper speed. This arrangement decreases the amount of pressure lost at each of the discharge terminals and also reduces the pressure of the air present in the terminal box or chamber 24.

The terminal box has a suitably supported bottom or floor 55 for enabling signal means to be operated to indicate when a carrier has been discharged into the terminal box from the conveyor tube. Contact points 56 are provided, one on the floor and one on the base of the terminal box.

Resilient means 54 holds the floor upward so that the contact points are normally separated when no carriers are resting upon the floor. A circuit including these contacts is provided to connect with the signal device 57. When a carrier is deflected from the conveyor tube, it drops on the movable floor of the terminal box and causes the contacts to be closed and the signal device to be operated, indicating that a carrier has been received. A door 60 is provided in one side of the box through which the carrier may be removed by the station attendant.

The selective operation of the conveyor system embodying the foregoing features and employing black and white carriers is accomplished substantially in the following manner. Carriers intended or destined for the intermediate station will be black while carriers destined for the end or distant station will be white. When it is desired to send the carrier from station A, which is the main station, to the intermediate station B, a black carrier will be inserted in the conveyor system through the inlet 14. As the carrier 15 travels toward the intermediate station B it will pass before the opening 17 in the conveyor tube, which is enclosed within the compartment 16, and through which light from the source 18 is reflected upon the carrier. The selenium cell 19 and the associated control circuit is adjusted to respond to white carriers and not to black. Since the carrier inserted is a black carrier, the selenium cell will not respond and the deflector 27, being normally positioned in the path of the carrier, will act to divert the carrier from the open loop 26 through the cut-away side of the guide 30 whereupon it will drop to the floor 55 of the terminal box 24 and operate the signal device 57.

When it is desired to send a carrier from station A to the end station C a white carrier is fed into the tube 10 through inlet 14. As the white carrier approaches the intermediate station B it passes before the opening 17 in the conveyor tube, at which point light from the light source 18 is thrown from the carrier and reflected on the selenium cell 19. The selenium cell is so adjusted that the amount of light reflected from the white carrier causes the current flow through the cell to increase, triggering off the arc discharge relay 33 through the starting grid 38, whereupon the solenoid 32 is operated to swing the deflector 27 out of the path of travel of the carrier, permitting the latter to continue around the loop guideway 26, and enter the closed portion of the tube through the extension 25. As the carrier passes into the entrance of the extension, it will operate the switch 34 by engaging the cam 35, thereby interrupting the anode circuit of the relay tube, which suppresses the arc flow through the tube and permits the deflector to return to its normal position.

In case the deflector control should fail to respond to the carrier as it passes before the opening 17, the deflector will not be operated but due to the normal setting thereof, the carrier will be discharged at station B. However, as already explained, this failure does not render the system inoperative by hand. The station attendant will upon removing the carrier from the terminal box, observe that it is designated for station C. He will then forward it to station C by replacing it in the conveyor through the inlet 54.

Any suitable type of discharge may be employed at station C. However, it is preferable to employ a form of the well known drum type in which the air is shunted around the outlet and enters the inlet of the return tube section.

When it is desired to send a carrier from Station B to Station C, this may be accomplished simply by inserting the carrier through the side door inlet 54, provided in the downwardly extending leg 25.

From station C carriers may be returned to the main or central station A through the return carrier tube 11. This tube is provided with a loop discharge arrangement at the intermediate station B similar to that employed in the forward tube 10 of the carrier system. A similar type of light sensitive cell and control arrangements may be employed.

In some instances it is desirable to install the systems so that the tubes approaching and leaving the discharge terminals provided at the various stations will be supported overhead or along the ceiling of the building. In this type of system the station discharges and auxiliary feeding inlets are provided by directing the conveyor tube downwardly to the station platform or desk on which the terminal apparatus is mounted. Carriers intended for that station are diverted from the main conveyor tube into branch tubes leading to suitable discharge terminals. Such a system is diagrammatically shown in Figure 6, as employing a main station A, a first intermediate station B and a second intermediate station C and a distant station D. These stations are connected with a forwardly extending conveyor tube 10'. The distant station D is connected with the main station A by a return tube 11'. The tube 10' is connected to a suitable source of pressure and the tube 11' with a suitable source of vacuum at station A. Intermediate discharges may be employed in connection with the return tube 11', as well as in connection with the forwardly extending tube 10'. However, for the sake of simplification of the drawings, such stations are not illustrated.

At each of the intermediate stations, conveyor tube 10' extends past a light sensitive control arrangement, enclosed in a compartment 16, and downwardly to the station platform through a rotary drum type inlet 65 to an upwardly extending section which connects with the main part of the conveyor tube leading to the succeeding station. In advance of the inlets 65 at each of the intermediate stations a branch tube 66 is provided connecting with the downwardly extending portion of the main tube. The branch tube 66 and main tube 10' are connected through a coupling 67 within which is mounted a shiftable deflector plate 68, pivotally supported about its lower side by a shaft 70 adjacent the base of the coupling and operable when disposed across the carrier path of the main tube to cause carriers to be deflected into the branch tube, where they pass downwardly to a discharge terminal 69, provided at the end of the branch tube.

The deflector plate 68 is normally arranged to rest before the opening of the branch tube in which position it permits the carriers to continue through the conveyor system along the main tube. When the light sensitive control means respond to light reflected from certain carriers, the deflector plate is moved over to rest across the opening or path of a carrier along the main tube, in which position it causes the carrier to be diverted into the branch tube 66 passing down to discharge terminal.

It will be observed that with the arrangement as set forth in Fig. 6, the deflectors are set normally to retain the carriers in the conveyor tube and not, as in the embodiment heretofore described, to normally discharge the carriers from the main conveyor tube. This arrangement does not have the advantage of remaining at all times operative by hand in case of failure of automatic operation. However, it has other advantages, particularly, due to the fact that the light sensitive control is required to respond only to the light reflected from the carrier or carriers to be discharged at any particular intermediate station and does not have to respond to all of the carriers which are to be permitted to pass a particular station and proceed to stations beyond. For this reason a more selective type of light sensitive control may be used and a greater number of intermediate stations may be employed in a single system. It is obvious, however, that the previous embodiment may be arranged to operate in the same manner as the present embodiment by setting the deflector member normally in its inoperative position and modifying the light sensitive control means accordingly. Likewise, as hereinafter described by suitably modifying the present embodiment it may be operated in a manner similar to the previous embodiment.

Greater selectivity in the light sensitive control may be provided by the use of photoelectric cells instead of selenium cells. As is well known, photocells are obtainable which respond very sharply to different colors or light wave bands of different lengths. For this reason when two or more stations are employed, it may be desirable to use colored carriers and photocells designed to respond thereto for the selective control. For example, the carriers may be colored black, red and blue. In order to increase the selective response of the cells to the carriers of different colors, a light filter screen may be interposed between the light source and the carrier so that substantially only light of the color to which the photocell is designed to respond will be thrown upon the carrier. Such an arrangement is diagrammatically illustrated in the compartment 16. In one section of the compartment is the source of light 18 and color filter 72, and in the other section of the compartment is the photocell 71. Light from the light source is projected through the screen 72 and slot 17 of the conveyor tube 10′, onto a passing carrier. If the color of the carrier corresponds to the color which the screen is arranged to pass, a substantial amount of light of that color will be reflected into the cell from the carrier. On the other hand, if the carrier is of a different color only a relatively small amount of light will be reflected and the photocell will not respond.

The system just described may be arranged to employ carriers reflecting different amounts or shades of light as well as colors. Where a small number of intermediate stations are employed, carriers arranged to reflect different amounts of light will be found satisfactory. Photocells can be obtained which can be adjusted to respond quite sharply to different amounts of light received by them.

The local operating circuit for actuating the deflector is controlled or governed by the photocell and may be similar to that shown and described in connection with Fig. 5, suitably modified to adapt the use of a photocell in place of the selenium cell.

The operation of the system with two intermediate stations having the deflector members normally set across the path of the branch tube will now be described. In order to send the carrier from the main station A to station B a blue carrier may be employed. The carrier is inserted into the conveyor tube 10′ at the inlet 14 of station A and at a point in advance of the deflecting member, it passes through the compartment 16 containing the photocell 71 arranged to respond to blue light or light at the higher end of the spectrum within the range of a color band including blue. The photocell upon responding energizes a local operating circuit, such as already described, which in turn through a relay will energize the deflector operating solenoid 32 and cause the same to move the deflector toward the left into the path of the main tube before the carrier arrives at the junction point. The carrier will thus be diverted into the branch tube 66 where it will proceed downward to the outlet terminal 69, from which it may be removed by the operator or attendant. As the carrier enters the branch tube 66, it engages the operating cam 35 of the switch 34 to deenergize the local operating circuit and permit the deflector member 68 to return to its normal position over the opening of the branch tube 66. In this manner, succeeding carriers to which the photocell 71 does not respond are retained in the main conveyor tube 10 and pass beyond station B.

In order to send carriers from the main station A to the intermediate station C, a red carrier may be employed. This carrier is inserted into the conveyor tube 10 and since the photocell 71 is designed to respond only to light in a band at the upper end of the spectrum including blue, it will be unresponsive to red light reflected toward it as the carrier passes through the compartment 16 associated with station B. Consequently, the deflector member 68 at station B remains in its normal position and the red carrier passes through station B and continues on toward station C. As it approaches station C it passes through the compartment 16 at that station, containing a photocell 75 responsive to red light or light at the lower end of the spectrum within the range of red. Cell 75 upon being energized by the light reflected from the carrier will cause the deflector member 68 to be moved over into the path of the main conveyor tube 10′, diverting the carrier into the discharge tube 66 of the station C.

Black carriers are employed when it is desired to send a carrier from station A to station D. It will be noted that the carrier must go through the two intermediate stations B and C in order to reach D. Since black carriers will reflect substantially no light into the photocells controlling the deflectors at the two intermediate stations and since the deflectors at these stations are normally positioned to permit carriers to pass, a black carrier from station A will proceed through stations B and C to station D without effecting the mechanism at the intermediate stations.

From the foregoing, it will be observed that the present embodiment of my invention provides a system in which the selective control mechanism for each intermediate station is required to respond only to carriers to be discharged at that station. This arrangement not only provides for the use of photocells arranged to respond sharply to a certain amount of light reflected from the carrier or a certain color band but also a system in which the control mechanisms will be called upon to function the minimum number of times.

The conveyor system illustrated in Fig. 6, however, may be arranged to operate in a similar manner to the preferred arrangement of my invention, that is, with the deflectors normally set to discharge from the conveyor tube, by employing the type of deflector arrangement illustrated in Figs. 7 and 8. Here the deflector 68 is substantially the same as already described in connection with Fig. 6 except that it is normally positioned in the path of the main conveyor tube 10' instead of the branch 66. Likewise, the releasing switch 34 is located along the main conveyor tube 10' instead of along the branch tube as in the former case. The solenoid 32 operated through a control arrangement substantially as already described actuates the deflector conveyor. When the control system is energized the solenoid pulls up the arm 73 secured to shaft 70 and moves the deflector over into the path of the branch tube.

A carrier intended or designated for a station beyond a certain intermediate station will be of such a color as to influence the photocell to cause the control mechanism to energize solenoid 32 and move the deflector plate over into the path of the branch tube. Then as the carrier arrives at the junction point it will be permitted to continue along the main carrier tube. When the carrier passes the switch 34, it will engage the cam 35 causing the circuit through the switch to open which in turn, as has been described, deenergizes the control system, permitting the deflector 68 to return to its normal position. Thus it will be seen that a carrier system employing a main tube and branch tube at the intermediate stations may, by suitable modification of the deflector and the associated control arrangement, be operated in either of the ways described herein.

It will be recalled that the control circuit for operating the deflector means in response to color or amount of light reflected from the carriers, as shown in Fig. 5, included an electronic discharge tube as the relay for operating the deflector actuating solenoid 32. The control circuits illustrated in Figs. 9 and 10 show how ordinary electromagnetic relays may be used in any of the foregoing systems.

The control circuit illustrated in Fig. 9 is operable from an alternating current source and embodies a photocell 71 provided with a suitable operating potential from the transformer 81. The current flow from the photocell, when it responds to light directed therein, is amplified through a vacuum tube 82 and a suitable connecting circuit. The amplified current from the vacuum tube 82 is arranged to energize the alternating current, electromagnetic relay 49 by flowing through a suitable winding 48 thereon. The relay, when energized in this manner, closes a divided shunt circuit across the A. C. power lines 39' and 41' so arranged that parallel circuits are completed from the contact 52 of the relay through the winding 53 of the control relay 49 and the solenoid 32. It will be observed that the winding 53 provides a locking circuit for the relay which will maintain the relay closed independent of the photocell control. The shunt circuit through this winding includes also the circuit breaking switch 34.

In operation, the photocell 71 in response to light received thereby, will produce a discharge in the vacuum tube 82 which will cause the winding 48 of the control relay to become energized simultaneously closing the parallel circuits through the locking winding 53 and solenoid 32. The locking winding 53 will maintain the solenoid circuit closed until a carrier strikes the cam 35, opening the circuit through the locking winding and permitting the relay tongue to drop away from the contact 52.

With high speed pneumatic tube systems, the carriers pass the photocell 71 in a brief interval which may be too short to permit the relay 49 to operate. In order to increase the period of energization of the operating winding 48 of the relay, a storage condenser 50 is connected in shunt to the grid and cathode to increase the grid capacity. The effect of a current impulse received from the photocell 71 is to charge the condenser so that it will continuously apply a charge to the grid to maintain the discharge in the tube for a substantial time after the carrier has passed the cell and sufficient to insure the operation of the relay 49. A high resistance 51 is provided around the condenser 50 to time the discharge thereof so that it will be conditioned to respond to the succeeding carrier.

In Fig. 10 we have shown a control circuit arrangement in which the thermionic devices have been omitted and the relay 49' operated through a sensitive magnetic relay. This system is applicable to systems in which the time of passage of the carrier past the light sensitive cell is sufficiently prolonged to enable the magnetic relay to operate. For this purpose the carrier may be slowed down as it approaches the cell or the entire system may be operated at a slower speed. It should be noted, however, that in the present system, the entire length of the carrier may be used as a light reflecting surface, so that the cell is energized during the entire period of passage of the carrier thereby. A means is shown in Fig. 6 for slowing down the carrier and comprises an air by-pass 87 around the portion of the tube passing through the compartment 16, and a control valve 88 for regulating the amount of air diverted from the tube. With a carrier speed of 1200 feet per minute and a carrier having a light reflecting length of six inches, the cell 19 will be energized for about one-fortieth of a second, which is sufficient to operate a sensitive magnetic relay. With higher carrier speed, for instance, up to 4000 feet per minute, the carriers may be momentarily slowed down, as they pass the light sensitive cell, to such speed as to enable the relay 46 to properly respond.

In this modification the electromagnetic relay is controlled or governed by a selenium cell instead of a photocell, since ordinarily the current flowing through a selenium cell is sufficient to operate a sensitive magnetic relay which in turn may control the operation of the main relay. As illustrated, the arrangement includes a selenium cell 19 and a suitable source of potential therefor supplied from the D. C. power lines 39 and 41. The auxiliary relay 46 is included in the selenium cell circuit and is arranged so that when the selenium cell is energized, it closes a shunt circuit, between the power lines, through the contacts 47 which include the control winding 48' of the relay 49'. The relay upon being energized, closes parallel shunt circuits between the power lines through the contact 52' of the control relay, one circuit including the locking winding 53, and circuit breaking switch 34, and the other shunt circuit including the solenoid 32. The operation of this circuit will be obvious from the foregoing description in connection with the circuit illustrated in Fig. 9.

In the embodiments of this invention, so far described, all of the stations have been serially connected by a single pneumatic tube, so that at any intermediate station, it is necessary only to make a selection between two possible routes. In Figs. 11 and 12 we have shown the invention applied to a forked system in which two or more separate tubes extend independently from the intermediate station or switching point, to distant stations, thereby requiring a selection of one of three or more possible routes.

In these latter embodiments the deflector mechanisms are located substantially adjacent each other, and therefore the control arrangement must be disposed to act cooperatively to bring about proper sequence of operation of the respective deflector mechanisms. This has been provided in Fig. 11 by locating the selecting mechanism for the deflector 68 in the lower fork in advance of the selecting mechanism for the deflector 68' in the upper fork. With this arrangement a carrier which is intended to be diverted into the first branch 85 might have a high light reflecting property which would cause a response by both photocells 71' and 75', as for instance, a white carrier. However, because of the respective positions, as can be ascertained by referring to Fig. 11, when the deflector 68', at the entrance of the branch tube 85, has been moved over to divert the carrier into that branch, the carrier will be diverted from the main tube 10 before it has reached the lower branch 86 and, therefore, whether or not the control for the latter branch has responded will make no difference. A carrier intended for branch 86, however, must have a lower light reflecting property, such as a gray carrier, so that the photocell 71' controlling branch 85 will not respond thereto. If such is the case, then only the deflector in the branch 86 will be moved to the dotted line position and the carrier will proceed along the main tube until diverted by this deflector.

The system shown in Fig. 11 is also adapted to the selection of carriers of different colors. A suitable color filter 87 is placed before the light source 18 so that only light of the desired color, corresponding to the color of the carrier to be discharged, will be directed onto the carrier as it passes before the slots or openings 17 in the conveyor tube. As an example, the colors of the carriers may be red, blue, and black. The photocell in the compartment 84 may be arranged to respond to the color red, and the cell in compartment 83 to the color blue, while neither will respond to black. The operation of the deflector control mechanism to selectively direct a carrier of a designated color, proceeding through the conveyor system, will be readily understood from the embodiments already described.

The arrangement of Fig. 12 is similar to that of Fig. 11, except that an interlocking arrangement is provided for preventing the deflector 68', at the entrance of the branch tube 85, from being operated in case the photocell in the compartment 83 should respond to a carrier intended for the lower branch 86 and which has caused a response in the photocell in the compartment 84. In this arrangement the interlocking feature is provided by including in the anode circuit of the relay tube 33, the winding 91 of a supplementary relay 92. This supplementary relay is provided with a tongue supplied with positive potential which is held on a back contact 93, by a spring 94, and arranged to move over to a front contact 95 when energized. The normal position of the relay tongue completes the anode circuit of the relay tube 33' which includes the solenoid 32', associated with the branch tube 85. While the other position of the relay tongue completes the anode circuit of the relay tube 33, which includes the solenoid 32, associated with the lower branch tube 86. Thus it will be seen that the operating circuit for only one of the deflector actuating solenoids 32 and 32' can be completed at one time, or in other words, when the circuit for one solenoid is completed, the other is locked out.

The advantages of this type of arrangement permits carriers radiating or reflecting different amounts of light to be employed instead of colored carriers. As an example, white, gray and black carriers may be employed. The control mechanisms should be arranged so that the photocell in compartment 84 would respond only to white, while the photocell in compartment 83 would be adjusted to respond to gray, and as is obvious, will respond to white also. However, due to the interlocking control just described, if the photocell in compartment 84 has responded, the control operated from compartment 83 will be locked out and no operation will result from any response of the photocell 71' to a white carrier. The operation of the arrangement will be clearly understood in connection with the foregoing description when a gray or black carrier is used.

The general advantages of the arrangements illustrated in Figs. 11 and 12, as just described, will be apparent in a conveyor system in which it is desired that the main conveyor tube extend by the shortest route from the main office to the distant branch office, while the intermediate branch offices may be located at some distance to one side of this direct route. In such cases, where the branch offices are located close together, it may be desirable that the switching apparatus be concentrated at one point, for purposes of installation and maintenance. These embodiments might also be useful where several branch stations are located in one building or in one office, thus permitting the operator at the main office to send a carrier to any station desired. Other advantages of the arrangements will be apparent to those skilled in the art.

From the foregoing it will be noted that we have provided means for selectively controlling the discharge of carriers from a conveyor tube at any one of several points therealong without employing means for making mechanical connections or otherwise directly engaging the carriers as they pass along the conveyor tube to actuate the selective control mechanism. In addition, we have provided a system which, upon failure of automatic operation, can be continued in operation as a non-selective system.

While we have illustrated the switch mechanism and the operating means therefor as being restored to normal by the carrier, it is to be understood that other means may be provided, as for instance, a timing device operating a predetermined time after the carrier passes the light sensitive cell. In fact, the reset cam 35 may be considered as such a timing device, since with a predetermined carrier speed and spacing of the light sensitive cell and cam, the latter will function in timed relation to the activation of the cell.

It will be obvious to those skilled in the art that the invention is not limited to the specific modifications shown and described, but is susseptible to various other changes and embodiments without departing from the spirit thereof, and we desire, therefore, that only such limita-

What we claim is:

1. In a pneumatic conveyor system, a conveyor tube, carriers adapted to travel through the tube, a discharge station provided along an intermediate portion of the tube, said discharge station comprising a portion of the conveyor tube arranged to form a loop embodying an arcuate shaped trough portion open around the inside, said loop providing for the traveling carriers to be held in the trough portion by centrifugal force, shiftable deflecting means operable in one position to deflect the traveling carriers from the tube at the open part of the loop, and operable in another position to permit the carriers to pass around the loop and re-enter the closed part of the tube.

2. In a pneumatic conveyor system, a conveyor tube, carriers adapted to travel through the tube, a discharge station provided along an intermediate portion of the tube, said intermediate station comprising a portion of a conveyor tube arranged to form a loop embodying an arcuate shaped trough portion open around the inside, said loop providing for carriers to be held in the trough portion by centrifugal force as they travel around the center, a shiftable deflector operable in one position to divert the traveling carriers from the tube at the open part of the loop and operable in another position to permit the carriers to pass around the loop and re-enter the closed part of the tube, means for selectively shifting the deflector to cause certain carriers to be discharged and other carriers to continue in the conveyor tube.

3. A conveyor system according to claim 2 with means controlled by the light reflected from the carriers for selectively shifting the deflector.

4. A pneumatic carrier system comprising a main carrier tube, a plurality of branch tubes joined to the main tube at adjacent points, carriers adapted to travel through the system having predetermined light reflecting properties for indicating respective routes through the system, deflector means at the junction of each of the branch tubes with the main tube operable to divert carriers from the main into the branch tubes, a group of light sensitive devices disposed along the main tube in advance of the junction point of the main and branch tubes, said group including one device corresponding to each branch tube and operable through a local control means to govern the deflector means, each of said light sensitive devices being responsive to the light reflected from certain of the carriers for causing the corresponding deflector means to divert said carriers into the branch tube associated therewith said light sensitive devices being arranged in reverse order to the junction of the main tube and branch tube with which they are associated.

5. A pneumatic carrier system comprising a main carrier tube, two or more branch tubes joined one after another to the main tube, carriers adapted to travel through said system, certain of said carriers having predetermined light reflecting properties according to the branch tube through which they are to be routed, electrically operated deflectors at the junction of each of the branch tubes with the main tube adapted to divert carriers therefrom into the branch tubes, an individual electric circuit for controlling each deflector, a group of light sensitive devices disposed along the main tube in advance of the junction point of the main and branch tubes, said group including one device corresponding to each deflector and governing the corresponding controlling circuit for actuating the deflector, each of said light sensitive devices being responsive to the light reflected from carriers designated for the corresponding branch for actuating the deflector associated therewith, and interlocking means between the several operating circuits for causing the other circuits to become inoperative after a certain circuit has been energized in response to its governing device.

6. In a conveyor system, a conveyor, a switching device for directing articles being conveyed through the conveyor, a light sensitive cell disposed in advance of the switching device and arranged to receive light reflected from said articles, means for decreasing the speed of said articles as they pass said cell and means controlled by said light sensitive cell for operating said switching device.

7. In a conveyor system, a conveyor, a switching device for directing articles being conveyed through the conveyor, means disposed in advance of the switching device and subject to a condition produced by said articles for operating said switching device, and means for decreasing the speed of said articles as they pass said first means.

WILLIAM V. McGUINNESS.
JOHN M. CHULSTROM.
ADAM DRENKARD, Jr.